(12) United States Patent
Ishida et al.

(10) Patent No.: US 12,367,276 B2
(45) Date of Patent: Jul. 22, 2025

(54) LOG MANAGEMENT DEVICE AND CENTER DEVICE

(71) Applicant: DENSO CORPORATION, Kariya (JP)

(72) Inventors: Naoya Ishida, Kariya (JP); Masumi Egawa, Kariya (JP); Takeshi Sugashima, Kariya (JP); Taiji Abe, Kariya (JP); Katsuya Tanaka, Kariya (JP); Reiichirou Imoto, Kariya (JP); Keigo Nagara, Kariya (JP)

(73) Assignee: DENSO CORPORATION, Kariya (JP)

( * ) Notice: Subject to any disclaimer, the term of this patent is extended or adjusted under 35 U.S.C. 154(b) by 126 days.

(21) Appl. No.: 17/371,163

(22) Filed: Jul. 9, 2021

(65) Prior Publication Data

US 2022/0019662 A1   Jan. 20, 2022

(30) Foreign Application Priority Data

Jul. 14, 2020   (JP) .................................. 2020-120910

(51) Int. Cl.
*G06F 21/55*   (2013.01)
(52) U.S. Cl.
CPC ...... *G06F 21/552* (2013.01); *G06F 2221/034* (2013.01)
(58) Field of Classification Search
CPC .......................... G06F 21/552; G06F 2221/034
See application file for complete search history.

(56) References Cited

U.S. PATENT DOCUMENTS 10,380,057 B2 *   8/2019   Nara ....................... G06F 13/36
11,115,425 B2 *   9/2021   Ando .................. H04L 63/1425
2019/0141072 A1   5/2019   Sasaki
2019/0156593 A1   5/2019   Sasaki
2019/0371085 A1 * 12/2019   Kishikawa ........... G08G 1/0112
2020/0156652 A1 *  5/2020   Abundis Vargas ... B60W 50/14
(Continued)

FOREIGN PATENT DOCUMENTS

JP       2019061726 A       4/2019
JP       2019-125344 A      7/2019
WO   WO-2020090146 A1 *    5/2020   ........... B60R 16/023

OTHER PUBLICATIONS

Neetu Singh • Ritu Agarwal; Intrusion Detection System for Smart Vehicles Using Machine Learning Algorithms; 2023 International Conference on Communication, Security and Artificial Intelligence (ICCSAI) (2023, pp. 749-753); (Year: 2023).*

(Continued)

*Primary Examiner* — Roderick Tolentino
*Assistant Examiner* — Chao Wang
(74) *Attorney, Agent, or Firm* — Harness, Dickey & Pierce, P.L.C.

(57) ABSTRACT

A center device is provided that receives a log from vehicle-mounted equipment transmitting the log based on an external transmission rule and analyzes the log to detect a cyber attack. Based on a result of the detecting, the center device determines update of the external transmission rule. The center devices transmits an external transmission rule update instruction. As attack depth of the cyber attack is deeper, the center device sets an external transmission target to the log that is generated in a deeper layer among layers in which constituent elements of the vehicle-mounted equipment are defined.

15 Claims, 9 Drawing Sheets

(56) References Cited

U.S. PATENT DOCUMENTS

2021/0056776 A1     2/2021   Sasaki
2021/0112085 A1     4/2021   Sasaki

OTHER PUBLICATIONS

Hyunghoon Kim • Wonsuk Choi • Hyo Jin Jo; PE-Detector: Intrusion Detection of Periodic and Event Message Attacks on Controller Area Networks; IEEE Transactions on Vehicular Technology (vol. 73, Issue: 12, 2024, pp. 19374-19388): (Year: 2024).*
Ulf E. Larson • Dennis K. Nilsson • Erland Jonsson; An approach to specification-based attack detection for in-vehicle networks; 2008 IEEE Intelligent Vehicles Symposium (2008, pp. 220-225); (Year: 2008).*
U.S. Appl. No. 17/346,314, filed Jun. 14, 2021, Nagara et al.
U.S. Appl. No. 17/368,999, filed Jul. 7, 2021, Nagara et al.
U.S. Appl. No. 17/371,146, filed Jul. 9, 2021, Imoto et al.
U.S. Appl. No. 17/371,148, filed Jul. 9, 2021, Nagara et al.

\* cited by examiner

FIG. 4

| ECU level layers | Layer variations | |
|---|---|---|
| | Layers for security sensors | Monitoring target (OSI model) layers |
| External connection ECU | Log of security sensor A (network monitoring) | L2 data link layer |
| | | L3 network layer |
| | | L4 transport layer |
| | | L7 application layer |
| | Log of security sensor B (host monitoring) | ~ |
| | : | : |
| Central ECU | Log of security sensor C (network monitoring) | L2 data link layer |
| | | L3 network layer |
| | | L4 transport layer |
| | | L7 application layer |
| | : | : |
| Internal ECU | Log of security sensor B (host monitoring) | ~ |

FIG. 5

| ECU level layers | Layer variations | |
|---|---|---|
| | Layer for each log | Monitoring target layers |
| External connection ECU | CAN log (periodic sampling) | CANID: 0x001 |
| | | CANID: 0x002 |
| | | : |
| | Log of alive monitor result (ECU) | -- |
| | Log of alive monitor result (security sensor A) | -- |
| | : | : |
| Central ECU | CAN log (periodic sampling) | CANID: 0x003 |
| | | CANID: 0x004 |
| | | : |
| | Log of alive monitor result (ECU) | -- |
| | Log of alive monitor result (security sensor A) | -- |
| | : | : |
| Internal ECU | CAN log (periodic sampling) | CANID: 0x005 |

FIG. 6A

| ECU level layers | Layer variations | | Upload is necessary or not (0: Not necessary, 1: Necessary) |
|---|---|---|---|
| | Layers for security sensors | Monitoring target (OSI model) layers | |
| External connection ECU | Log of security sensor A (network monitoring) | L2 data link layer | 1 |
| | | L3 network layer | 1 |
| | | L4 transport layer | 1 |
| | | L7 application layer | 1 |
| | Log of security sensor B (host monitoring) | : | 1 |
| Central ECU | Log of security sensor C (network monitoring) | L2 data link layer | 1 |
| | | L3 network layer | 1 |
| | | L4 transport layer | 1 |
| | | L7 application layer | 1 |
| | Log of security sensor D (host monitoring) | : | 1 |
| Internal ECU | Log of security sensor B (host monitoring) | : | 0 |

FIG. 6B

| ECU level layers | Layer variations | | Upload is necessary or not (0: Not necessary, 1: Necessary) |
|---|---|---|---|
| | Layers for security sensors | Monitoring target (OSI model) layers | |
| External connection ECU | Log of security sensor A (network monitoring) | L2 data link layer | 1 |
| | | L3 network layer | 1 |
| | | L4 transport layer | 1 |
| | | L7 application layer | 1 |
| | Log of security sensor B (host monitoring) | : | 1 |
| Central ECU | Log of security sensor C (network monitoring) | L2 data link layer | 1 |
| | | L3 network layer | 1 |
| | | L4 transport layer | 1 |
| | | L7 application layer | 1 |
| | Log of security sensor D (host monitoring) | : | 0 |
| Internal ECU | Log of security sensor B (host monitoring) | : | 0 |

FIG. 6C

| ECU level layers | Layer variations | | Upload is necessary or not (0: Not necessary, 1: Necessary) |
|---|---|---|---|
| | Layers for security sensors | Monitoring target (OSI model) layers | |
| External connection ECU | Log of security sensor A (network monitoring) | L2 data link layer | 1 |
| | | L3 network layer | 1 |
| | | L4 transport layer | 1 |
| | | L7 application layer | 1 |
| | Log of security sensor B (host monitoring) | ... | 1 |
| Central ECU | Log of security sensor C (network monitoring) | L2 data link layer | 1 |
| | | L3 network layer | 1 |
| | | L4 transport layer | 1 |
| | | L7 application layer | 0 |
| | Log of security sensor D (host monitoring) | ... | 0 |
| Internal ECU | Log of security sensor B (host monitoring) | ... | 0 |

LOG MANAGEMENT DEVICE AND CENTER DEVICE

CROSS-REFERENCE TO RELATED APPLICATION

This application is based on Japanese Patent Application No. 2020-120910 filed on Jul. 14, 2020, disclosure of which is incorporated herein by reference.

FIELD

The present disclosure relates to a log management device provided in vehicle-mounted equipment to detect and analyze a cyber attack. The present disclosure also relates to a center device that detects and analyzes a cyber attack.

BACKGROUND

Cyber security is an issue in various fields including a field of vehicle for example.

SUMMARY

The present disclosure provides a center device, a log collection method, a log collection program, a log management device, and a log management method.

In a first example of the present disclosure, there is provided a center device that performs: receiving a log that vehicle-mounted equipment transmits based on an external transmission rule defining the log to be transmitted to outside of the vehicle-mounted equipment; analyzing the log to detect occurrence of a cyber attack; upon detecting the cyber attack, determining update of the external transmission rule based on a result of the detecting; and transmitting an external transmission rule update instruction to the vehicle-mounted equipment when the update of the external transmission rule is determined. Determining the update of the external transmission rule incudes: as attack depth of the cyber attack is deeper, setting an external transmission target to the log that is generated in a deeper layer among layers in which constituent elements of the vehicle-mounted equipment are defined.

In a second example of the present disclosure, there is provided a log collection method comprising: receiving a log that vehicle-mounted equipment transmits based on an external transmission rule defining the log to be transmitted to outside of the vehicle-mounted equipment; analyzing the log to detect occurrence of a cyber attack; upon detecting the cyber attack, determining update of the external transmission rule based on a result of the detecting; and transmitting an external transmission rule update instruction to the vehicle-mounted equipment when the update of the external transmission rule is determined. Determining the update of the external transmission rule incudes: as attack depth of the cyber attack is deeper, setting an external transmission target to the log that is generated in a deeper layer among layers in which constituent elements of the vehicle-mounted equipment are defined.

In a third example of the present disclosure, there is provided a log collection program executable by a center device, the log collection program causing the center device to perform the log collection method described above.

In a fourth example of the present disclosure, there is provided a log management device that collects and manages a log from an electronic control device included in vehicle-mounted equipment mounted in a vehicle. The log management device performs: collecting the log based on an internal transmission rule defining the log to be transmitted from the electronic control device to the log management device; storing the log collected; determining the log to be transmitted to a center device based on an external transmission rule defining the log to be transmitted to outside of the vehicle; and transmitting the log determined.

In a fifth example of the present disclosure, there is provided a log management method executed by a log management device that collects and manages a log from an electronic control device included in vehicle-mounted equipment. The log management method comprises: collecting the log based on an internal transmission rule defining the log to be transmitted from the electronic control device to the log management device; storing the collected log; determining the log to be transmitted to a center device based on an external transmission rule defining the log to be transmitted to outside of the vehicle-mounted equipment; and transmitting the determined log.

In a sixth example of the present disclosure, there is provided a log management program executable by a log management device and causing the log management device to perform the log management method described above.

BRIEF DESCRIPTION OF DRAWINGS

Objects, features and advantages of the present disclosure will become more apparent from the below detailed description made with reference to the accompanying drawings. In the drawings:

FIG. 4 is a diagram for illustrating constituent elements and layers in an abnormal log according to an embodiment of the present disclosure;

FIG. 5 is a diagram for illustrating constituent elements and layers in a normal log according to an embodiment of the present disclosure;

FIG. 6A is a diagram for illustrating determined details of an external transmission rule according to an embodiment of the present disclosure;

FIG. 6B is a diagram for illustrating determined details of the external transmission rule according to an embodiment of the present disclosure;

FIG. 6C is a diagram for illustrating determined details of the external transmission rule according to an embodiment of the present disclosure.

DETAILED DESCRIPTION

Figure 1:
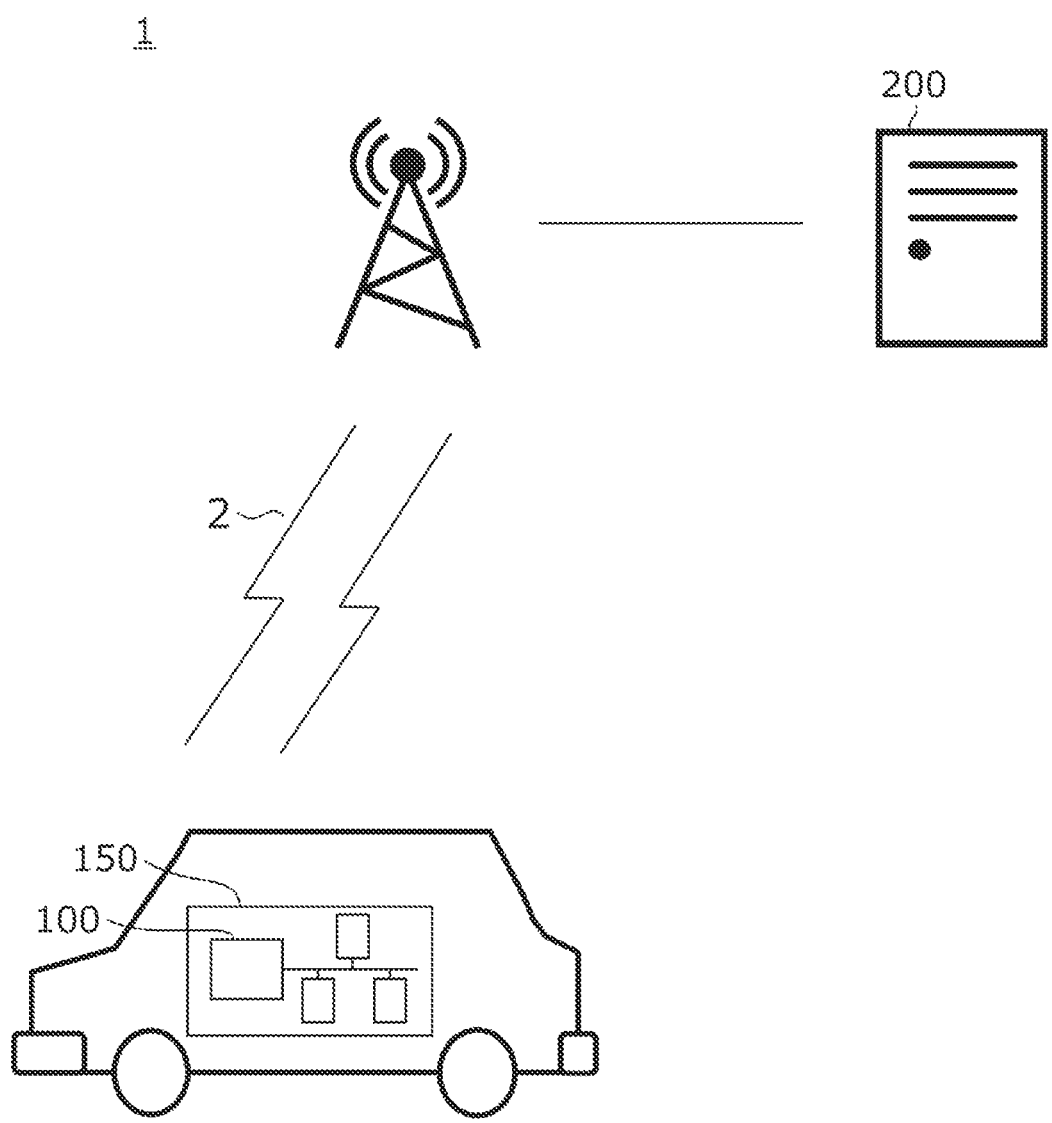
FIG. 1 is a diagram illustrating a configuration example of a cyber attack detection system according to an embodiment of the present disclosure.

In recent years, technologies for providing driver-assistance and autonomous driving control, including V2X communication such as vehicle-to-vehicle (V2V) communication and vehicle-to infrastructure (V2I) communication, have attracted attention. Along with this, a vehicle has a communication function, and so-called connectivity of the vehicle has been promoted. As a result, a probability of a cyber attack on a vehicle is increasing. Since control of a vehicle may be lost due to a cyber attack, stronger defense against the cyber attack is required.

Regarding a cyber attack on a vehicle, there is a device that changes a path of communication with the outside, a log storage destination, and a storage target log depending on the depth of the attack.

The inventors have found the following.

A vehicle having a communication function transmits a lot of logs to a center device even when a cyber attack is absent, and thus the vehicle is always in high communication load.

It is an object of the present disclosure to provide a technology for reducing the number of logs transmitted from a vehicle to a center device. Logs transmitted from the vehicle may be narrowed down into logs that are potentially needed.

It is another object of the present disclosure to provide a technology for preventing erasure of logs that are potentially needed. The logs may be stored in an appropriate location.

In an aspect of the present disclosure, there is provided a center device that comprises: a receiver unit that receives a log that vehicle-mounted equipment mounted in a vehicle transmits based on an external transmission rule defining the log to be transmitted to outside of the vehicle; a log analyzer unit that analyzes the log to detect occurrence of a cyber attack; an external transmission rule update determiner unit that, upon the log analyzer unit detecting the cyber attack, determines update of the external transmission rule based on a result of the detecting; and a transmitter unit that transmits an external transmission rule update instruction to the vehicle-mounted equipment upon determining the update of the external transmission rule. As attack depth of the cyber attack is deeper, the external transmission rule update determiner unit sets an external transmission target to the log that is generated in a deeper layer among layers in which constituent elements of the vehicle-mounted equipment are defined.

In another aspect of the present disclosure, there is provided a log management device that collects and manages a log from an electronic control device included in vehicle-mounted equipment mounted in a vehicle. The log management device comprises: a log collection manager unit that collects the log based on an internal transmission rule defining the log to be transmitted from the electronic control device to the log management device; a storage unit that stores the log collected by the log collection manager unit; an external transmission manager unit that determines the log to be transmitted to a center device based on an external transmission rule defining the log to be transmitted to outside of the vehicle; and a transmitter unit that transmits the log determined by the external transmission manager unit.

With the above-described configurations, the number of logs transmitted from the vehicle to the center device can be reduced. Erasure of logs that are potentially needed can be prevented.

Hereinafter, embodiments will be described with reference to the drawings.

In the description of embodiments, effects of embodiments may be described.

With regard to two or more embodiments, a configuration disclosed in a respective embodiment is not limited to the respective embodiment. Configurations of different embodiments may be combinable. For example, a configuration disclosed in one embodiment may be combined with another embodiment. Configurations disclosed in embodiments may be collected and combined.

1. Embodiment 1

(1) Overall Configuration of Cyber Attack Detection System

First, an overall configuration of a cyber attack detection system will be described with reference to FIG. 1.

A cyber attack detection system 1 includes vehicle-mounted equipment 150 "mounted in" a vehicle. The vehicle is an example of a "movable object". The cyber attack detection system 1 further incudes a center device 200. The vehicle-mounted equipment 150 includes a log management device 100, one or more "electronic control devices" (also called electronic control units and abbreviated to ECUs), and an in-vehicle network that connects these devices. The log management device 100 is also an ECU in a broad sense.

The "movable object" refers to an object that is movable, and its travel speed may be any speed, and therefore the movable object in a stopped state is also the movable object. Examples of the movable object include automobiles, motorcycles, bicycles, pedestrians, ships, aircrafts, and objects mounted thereon.

The term "mounted" in a movable object includes not only directly fixed to the movable object but also moved together with the movable object when not fixed to the movable object. For example, the movable object may be an object carried by a person onboard the movable object. The movable object may be an object mounted in a cargo on the movable object. The term "electronic control device" may refer to any device as long as it processes information and exhibits a specific function. For example, the electronic control device may be a device called an information processing device, an information processing circuit, a controller unit, a control device, a calculation apparatus, or the like. Its form may be various including a form of component, a form of semifinished product and a form of finished product. Example of the form of component include a semiconductor circuit and a semiconductor module. Examples of the form of semifinished product include an electronic control device, an electronic control unit. Examples of the form of finished product include a server, a workstation, a personal computer (PC), a smartphone, a cellular phone, and a navigation system.

The vehicle-mounted equipment 150 is connected to the center device 200 via a communication network 2.

The communication network 2 may use a wireless communication system. Examples of the wireless communication system include IEEE 802.11 (WiFi (registered trademark)), IEEE 802.16 (WiMAX (registered trademark)), (Wideband Code Division Multiple Access (W-CDMA), High Speed Packet Access (HSPA), Long Term Evolution (LTE), Long Term Evolution Advanced (LTE-A), 4G, 5G, etc. Also, Dedicated Short Range Communication (DSRC) may be used.

The communication network 2 may use a wired communication system. Examples of the wired communication system include a local area network (LAN), the Internet, and a fixed telephone line.

A combination of the wireless communication system and the wired communication system may be used as the wireless communication network. For example, the vehicle-mounted equipment 150 and a base station device in a cellular system may be connected to each other via the wireless communication system, and the base station device and the center device 200 may be connected to each other via the wired communication system such as a core line of a communication carrier, the Internet, etc.

(2) Configuration of Vehicle-Mounted Equipment

A configuration of the vehicle-mounted equipment 150 of the present embodiment will be described with reference to FIG. 2.

The vehicle-mounted equipment 150 includes a log management device 100, an ECU 2, an ECU 3, and an ECU 4. The ECU 2, the ECU 3, and the ECU 4 are connected to the log management device 100 via an in-vehicle network and will be collectively referred to as respective ECUs.

The log management device 100 includes a controller unit 101, a storage unit 104, a transmitter unit 105, and a receiver unit 106.

The log management device 100 and respective ECUs, included in the vehicle-mounted equipment 150, may each include a general-purpose central processing unit (CPU), a volatile memory, various interfaces, and an internal bus connecting theses. Examples of the non-volatile memory include a ROM, a flash memory, and a hard disk. Hardware executes software, thereby implementing functions of respective functional blocks illustrated in FIG. 2. The same applies to the below-described center device 200 illustrated in FIG. 3.

These devices and units may be implemented by dedicated hardware such as an LSI.

In an embodiment, it is assumed that the log management device 100 is provided as the form of semifinished product, specifically, in the form of electronic control device. However, the present disclosure is not limited to this example. For example, the log management device 100 may be provided as the form of component, for example, a semiconductor circuit or a semiconductor module. Alternatively, the log management device 100 may be provided as the form of finished product, for example, a personal computer (PC), a smartphone, a cellular phone, or a navigation system.

The log management device 100 may be provided as a single ECU. Alternatively, the log management device 100 may be provided as a plurality of ECUs. For example, the transmitter unit 105 and the receiver unit 106 may be implemented by a communication ECU. In this case, a plurality of ECUs including the communication ECU constitute the log management device 100.

In the present embodiment, respective ECUs and the log management device 100 belong to layers. In the case of FIG. 2, the log management device 100 belongs to a layer-1, the ECU 2 is a layer-2 ECU, the ECU 3 is a layer-3 ECU, and the ECU 4 is a layer-4 ECU. In the present description, the layers to which respective ECUs belong will be referred to as "layers in which the electronic control devices (ECUs) are defined".

In some embodiments, when the communication ECU, which is a contact point with the outside, is used as a reference, the deeper the layer, the longer the distance from the communication ECU. For example, when the communication ECU belongs to the layer-1, a central gateway ECU (CECU), which is connected to the communication ECU and individual ECUs and manages the individual ECUs, may be defined as belonging to the layer-2. The individual ECUs may be defined as belonging to the layer-3 and subsequent layers. A sub-gateway ECU or the like may be further used to subdivide into a domain or a sub-network and a further layer may be provided. The log management device 100 of the present embodiment is included in the communication ECU in the layer-1. Alternatively, the log management device 100 may be included in the CECU in the layer-2.

The in-vehicle network may use a Controller Area Network (CAN) and/or a Local Interconnect Network (LIN). Alternatively or additionally, the in-vehicle network may use Ethernet (registered trademark), Wi-Fi (registered trademark) and/or Bluetooth (registered trademark).

Respective ECUs may not be limited to particular ones. Examples of respective ECUs include drive system electronic control devices for controlling an engine, a steering wheel, a brake, and the like, vehicle body system electronic control devices for controlling a meter, a power window, and the like, information system electronic control devices such as a navigation apparatus, and safety control system electronic control devices for performing control to prevent collision with an obstacle and a pedestrian. The ECUs may have a parallel relationship. Alternatively, the ECUs may be classified into master and slave.

The controller unit 101 controls operations of the storage unit 104, the transmitter unit 105, and the receiver unit 106. The controller unit 101 implements a log collection manager unit 102 and an external transmission manager unit 103.

The log collection manager unit 102 collects logs from respective ECUs and also collects the log of the log management device 100. An internal transmission rule defines the logs to be collected. Referring to the internal transmission rule, the log collection manager unit 102 instructs respective ECUs to transmit the logs. The internal transmission rule defines logs to be transmitted from the ECUs to the log management device 100. The internal transmission rule may also be referred to as a log transmission rule. Details of the internal transmission rule will be described later.

The log collection manager unit 102 rewrites the internal transmission rule based on an instruction from the center device 200.

The storage unit 104 stores the logs collected by the log collection manager unit 102. The storage unit 104 may store the internal transmission rule and/or an external transmission rule described below.

The storage unit 104 includes a non-volatile memory or a volatile memory.

The external transmission manager unit 103 determines a log to be transmitted to the center device 200, by referring to the external transmission rule. The external transmission rule defines a log to be transmitted to the outside of the vehicle-mounted equipment 150. The external transmission rule may also be referred to a log upload rule. Details of the external transmission rule will be described later.

The external transmission manager unit 103 rewrites the external transmission rule based on an instruction from the center device 200.

The transmitter unit 105 transmits, to the center device 200 via an antenna, the log determined by the external transmission manager unit 103.

When the communication ECU performing external communication is provided separately from the log management device 100, the transmitter unit 105 transmits the log to the communication ECU. Also in this case, the transmitter unit 105 transmits the log to the center device 200 via the communication ECU.

The receiver unit 106 receives an instruction from the center device 200 via the antenna A.

Respective ECUs and the log management device 100 each have the following configuration. However, not all of the ECUS may be provided with these configurations.

A security sensor 111 monitors whether there is an abnormality in communication or internal processing of the vehicle, and generates a security log when there is the abnormality.

A vehicle controller unit 112 controls the vehicle being an example of the movable object. A log generated by the vehicle controller unit 112 is a normal log and the vehicle controller unit 112 generates the log in a steady manner. Additionally or alternatively, the vehicle controller unit 112 may be generate an abnormal log. A steady log, which is the log generated in the steady manner, may be, for example, a CAN log or CAN data.

An alive monitor unit 113 monitors whether the security sensor 111 is operating normally and/or whether the vehicle controller unit 112 is operating normally. When there is an abnormality, the alive monitor unit 113 generates the abnormal log.

A storage region 114 stores logs generated by the security sensor 111, the vehicle controller unit 112, and the alive monitor unit 113. The storage unit 104 may play a role of the storage region 114 when the log management device 100 includes the security sensor 111, the vehicle controller unit 112 and the alive monitor unit 113.

In typical, the storage unit 104 of the log management device 100 may have a larger storage capacity than the storage region 114.

Based on an instruction from the log collection manager unit 102, a log notifier unit 115 reads the log from the storage region 114 and transmits the log to the log management device 100. Alternatively or additionally, the internal transmission rule may be stored in the storage region 114, and the log defined in the internal transmission rule may be voluntarily transmitted, which voluntary transmission is not based on the instruction from the log collection manager unit 102.

(3) Configuration of Center Device

Figure 3:
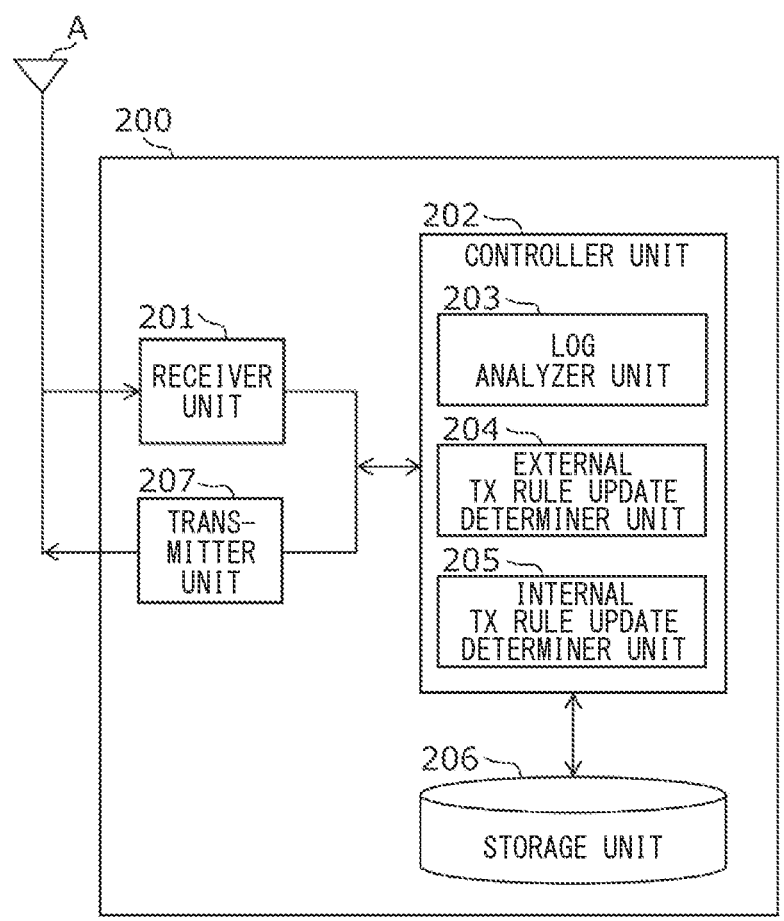
FIG. 3 is a block diagram illustrating a configuration example of a center device according to an embodiment of the present disclosure.

A configuration of the center device 200 of the present embodiment will be described with reference to FIG. 3.

The center device 200 includes a receiver unit 201, a controller unit 202, a storage unit 206, and a transmitter unit 207.

Some embodiments assume the center device 200 in the form of finished product, specifically, a server device. However, this is an example. The center device 200 may be in such form of finished product as a workstation, a personal computer (PC), etc. The center device 200 may be in such form of semifinished product as an ECU or such form of component as a semiconductor circuit element.

The receiver unit 201 receives the abnormal log and the normal log transmitted from the vehicle-mounted equipment 150 via the antenna A.

The abnormal log is a log that is activated and generated in response to occurrence of an abnormality. Examples of the abnormal log include a proxy log, an IDS log, and a process monitoring log.

The normal log is a log that is activated and generated periodically. Examples of the normal log include the log of the alive monitor of the security sensor and/or the ECU, and the log of the in-vehicle communication such as CAN, Ethernet, etc.

The log to be transmitted from the vehicle-mounted equipment 150 is selected based on the external transmission rule defining the log to be transmitted to the outside of the vehicle-mounted equipment 150. Details of the external transmission rule will be described later.

The controller unit 202 controls operations of the receiver unit 201, the storage unit 206, and the transmitter unit 207. The controller unit 202 implements a log analyzer unit 203, an external transmission rule update determiner unit 204, and an internal transmission rule update determiner unit 205.

The log analyzer unit 203 analyzes the log received by the receiver unit 201 to detect an occurrence of a cyber attack. Various methods may be used as its log analysis method.

The log analyzer unit 203 makes analysis to determine whether or not the log received by the receiver unit 201 is normal, and to detect an occurrence of the attack when the log is not normal. In cases of the vehicle-mounted equipment 150 including an abnormality detection device, a flag or additional information indicating an abnormality or a normality may be added to the log. Therefore, when there is a flag or additional information indicating an abnormality added to the log, the log analyzer unit 203 may determine whether the log is really an abnormal log. The log analyzer unit 203 detects an attack on the vehicle-mounted equipment 150 by using the following method.

The log analyzer unit 203 analyzes the log periodically received by the receiver unit 201, and when an abnormality in the log is found, detects an occurrence of a cyber attack on the vehicle-mounted equipment 150.

The log analyzer unit 203 detects the occurrence of an attack on the vehicle-mounted system 20 based on the log of the security sensor. The log of the security sensor is the log to which the flag or the additional information indicating an occurrence of an abnormality is added.

Alternatively, the occurrence of an attack is detected based on a correlation between logs indicating statuses of two or more ECUs included in the vehicle-mounted equipment 150. For example, there is a correlation between a log (hereinafter, referred to as a log "a") indicating a shift gear position and a log (hereinafter, referred to as log "b") indicating a speed of the vehicle. When the shift gear is in a parking (P) position, the speed of the vehicle is supposed to be zero. In this regard, when the log "b" indicates the speed higher than 0 while the log "a" indicates the parking position, there is a possibility of an occurrence of a certain abnormality in the vehicle or that the log may be incorrect and rewritten due to an attack. Based on this kind of correlation between the logs, the log analyzer unit 203 may detect the occurrence of an attack.

The log analyzer unit 203 may perform attack detection by using various methods. One example of the detection method includes comparing a blacklist and a whitelist with a list of logs received from the vehicle-mounted equipment 150 to detect the presence or absence of an abnormality. Another example of the method includes checking for consistency of the versions of the ECUs indicated by the logs. Yet another example of the method includes anomaly detection of an abnormal value out of values indicated by respective logs using a machine learning algorithm. Alternatively or additionally, a user such as a security analyst who uses the log center device 200 may perform abnormality detection by checking details of a log to detect the occurrence of a cyber attack.

Upon the log analyzer unit 203 detecting a cyber attack, the external transmission rule update determiner unit 204 determines update of the external transmission rule based on the detection result. Specifically, the external transmission rule update determiner unit 204 determines whether or not the update of the external transmission rule is necessary. When the update of the external transmission rule is necessary, the external transmission rule update determiner unit 204 determines details of the update. The log analyzer unit 203 generates an external transmission rule update instruction for instructing the vehicle-mounted equipment 150 to update the external transmission rule. An example of updating the external transmission rule will be described later.

Upon the log analyzer unit 203 detecting the cyber attack, the internal transmission rule update determiner unit 205 determines the internal transmission rule based on the detection result. More specifically, the internal transmission rule update determiner unit 205 determines whether or not the update of the internal transmission rule is necessary. When the update of the internal transmission rule is necessary, the internal transmission rule update determiner unit 205 determines details of the update. The log analyzer unit 203 generates an internal transmission rule update instruction for instructing the vehicle-mounted equipment 150 to update the internal transmission rule.

The update of the internal transmission rule may be based not directly on a detection result of a cyber attack. For example, upon determining update details of the external transmission rule, update details of the internal transmission rule may be determined based on the update details of the external transmission rule. Details of the internal transmission rule will be described later. An example of the update of the internal transmission rule will be described later.

The storage unit 206 stores the log received by the receiver unit 201. The storage unit 206 may store the update details of the external transmission rule and the update details of the internal transmission rule.

A non-volatile memory and/or a volatile memory constitutes the storage unit 206.

The transmitter unit 207 transmits the external transmission rule update instruction and the internal transmission rule update instruction to the vehicle-mounted equipment 150 via the antenna A.

(4) Log Type, Layer, and Attack Depth

The "constituent elements" of the vehicle-mounted equipment are defined in the "layers". Examples of the constituent elements include the ECUs. Examples of the constituent elements further include the security sensors included in the ECUs. Examples of the constituent elements further include elements according to the OSI model (Open System Interconnection model). Alternatively or additionally, a log itself, CAN data, and a CAN ID may be examples of the constituent elements.

The "constituent element" refers to hardware, or refers to software or data, and examples include electronic control devices, security sensors, OSI model elements, logs, CAN data, and CAN IDs.

The "layers" refer to "levels determined functionally and/or physically". Examples of the physically determined layers include layers determined by a distance from the communication ECU having the contact point with the outside, or by the number of via points on a path from the communication ECU. Examples of the functionally determined levels include layers determined by a master-slave relationship.

FIG. 4 illustrates examples of the constituent elements and layers for a case where the abnormal log is the external transmission target or the internal transmission target. In the case of FIG. 4, the constituent elements are ECUs, security sensors included in the ECUs, or OSI model elements.

In one example where the ECUs are the constituent elements, the ECUs include, for example, an external connection ECU belonging to the first layer, the central ECU belonging to the second layer, and the internal ECU belong to the third layer. The depth of the layer deepens in the order from the first layer, the second layer and the third layer. That is, the third layer is deeper than the second layer, and the second layer is deeper than the first layer.

In another example where one or more security sensors provided in each ECU are the constituent elements, the depth of the layer deepens in the order from a security sensor A and a security sensor B among the multiple security sensors. That is, the layer to which the security sensor A belongs is deeper than the security sensor B. The layers to which respective security sensors belong and relative depths of the layers are determinable by functions and/or monitoring target of the security sensors.

In yet another example where the OSI model elements included in each security sensor is the constituent elements, the depth of the layer deepens in the order from L2: data link layer, L3: network layer, L4: transport layer, and L7: application layer.

FIG. 5 illustrates examples of constituent elements and layers for a case where the normal log is the external transmission target or the internal transmission target. In the case of FIG. 5, the constituent elements are ECUs, the log types, or the CAN IDs.

The same as is the case of the FIG. 4 applies to the case of the ECUs being the constituent elements in FIG. 5.

In an example shown in FIG. 4 where the log types are the constituent elements, the depth of the layer deepens in the order from a CAN log, a log of a result of alive monitoring on the ECU, and a log of a result of alive monitoring on the security sensor. The layers to which respective logs belong and relative depths of the layers are determined by functions and/or monitoring target.

In another example where the CAN IDs are the constituent elements, the larger the identification number of the CAN ID, the deeper the depth of the layer.

The depths of the layers are defined on a constituent element basis. Alternatively, the depths of the layers may be defined between the constituent elements as illustrated in FIGS. 4 and 5. For example, in FIG. 4, L2: data link layer of the security sensor C of the central ECU is deeper in layer depth than L7: application layer of the security sensor A of the external connection ECU.

(5) External Transmission Rule and Update Examples Thereof

The external transmission rule is considered a rule concerning how much the center device 200 should collect the information used for detecting a cyber attack and the information used for determining the measures upon detecting the cyber attack.

With regard to cyber attack detection, it is necessary to detect a cyber attack at an early stage before damage becomes serious while it is necessary to reduce an amount of communication in normal times. Therefore, for detecting a cyber attack, it is preferable to collect the log of a shallow (i.e., not deep) layer in the case where the vehicle-mounted equipment 150 are provided with the layers in which the constituent elements of the vehicle-mounted equipment 150 are defined.

In contrast, after the cyber attack is detected, it is necessary to collect a deeper layer log than the log used for the cyber attack detection, and it is necessary to take measures to prevent the spread of damage. In other words, after the cyber attack is detected, it is desirable to collect a log of a deeper layer.

As described above, as "attack depth" of the cyber attack is deeper, the external transmission rule update determiner unit 204 sets the external transmission target to the log generated in a deeper layer among the "layers" in which the "constituent elements" included in the vehicle-mounted equipment 150 are defined. For example, the external transmission target is set to a log that is generated in a layer deeper than a layer in which the cyber-attacked ECU is defined in the vehicle-mounted equipment 150.

The "attack depth" includes not only a distance to the cyber attack target ECU from the communication ECU having the contact point with the outside or the number of via points to the cyber attack target ECU, but also the severity of the attack on the vehicle-mounted equipment.

Figure 2:
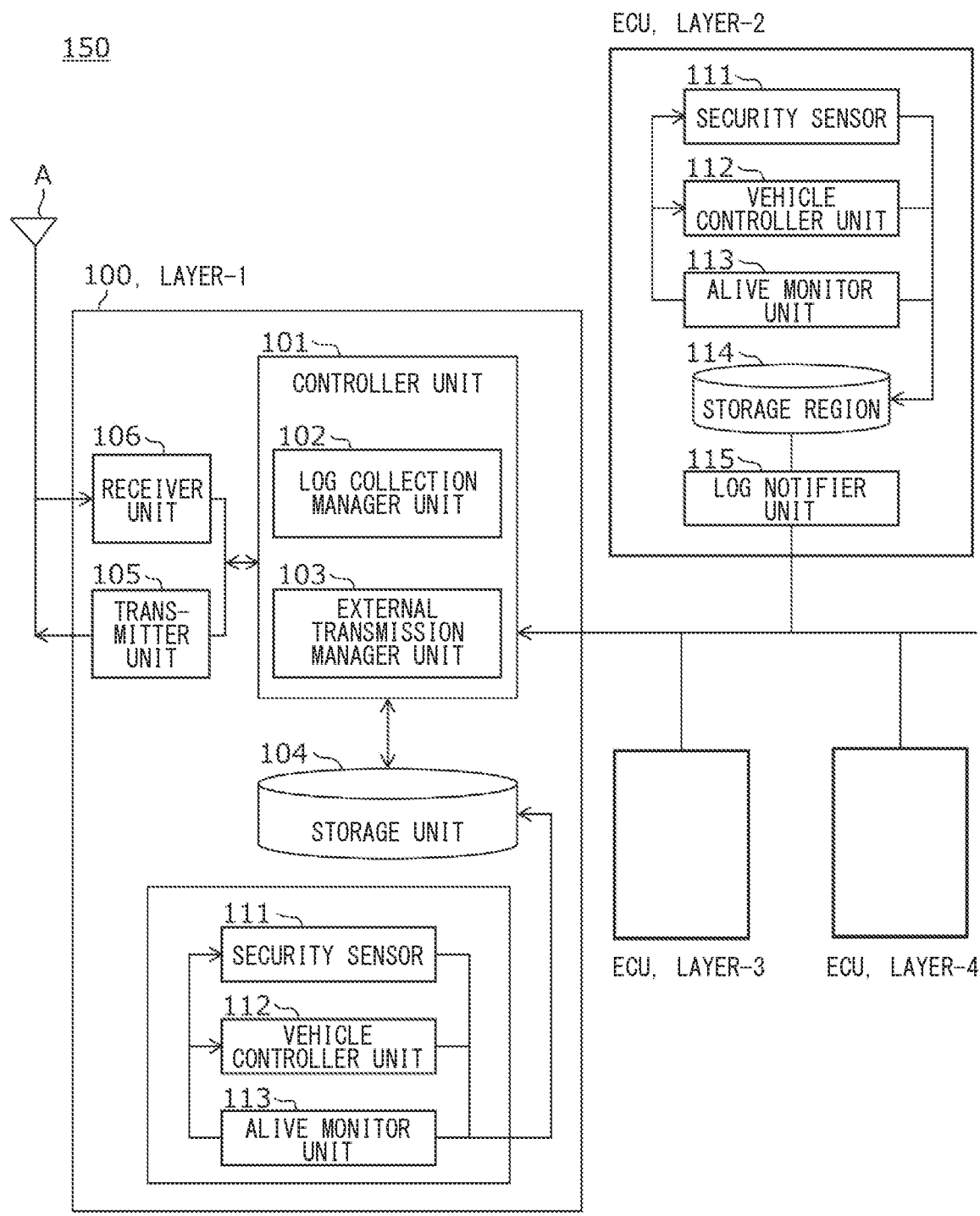
FIG. 2 is a block diagram illustrating a configuration example of a log management device according to an embodiment of the present disclosure.

For example, let us assume the configurations of the ECUs as illustrated in FIG. 2. In this case, the external transmission rule update determiner unit 204 updates the external transmission rule such that the log of the ECU in the first layer is set as the external transmission target in normal times, and, upon detecting the cyber attack, the logs of the ECUs in the second layer and the third layer in addition to the log of the ECU in the first layer are set as the external transmission target.

In another example, the external transmission rule update determiner unit 204 updates the external transmission rule such that a log of the ECU in the first layer is set as the external transmission target in normal times, and, upon detecting the cyber attack on the ECU in the first layer, the logs of the ECUs in the second layer and the third layer deeper than the cyber-attacked first layer are set as the external transmission target.

The attack depth of the cyber attack may be evaluated taking into account the severity of the attack. In this case, the external transmission rule may be updated as follows.

Upon detecting the attack on the external communication ECU, the external transmission rule update determiner unit 204 determines update details of the external transmission rule based on the severity of the attack, as illustrated in FIG. 6.

When an attack on the external connection ECU in the first layer is detected and there is a possibility that control in the first layer is already hacked (corresponding to "case where the attack depth is deeper than a first level") as illustrated in FIG. 6A, the external transmission rule is updated such that all logs of the central ECU in the second layer are set as the external transmission target.

When the attack on the external connection ECU in the first layer is detected and there is a possibility of intrusion into the first layer (corresponding to "case where the attack depth is intermediate between the first level and a second level") as illustrated in FIG. 6B, the external transmission rule is updated such that a log of the security sensor C of the central ECU in the second layer is set as the external transmission target.

When an attack on the external connection ECU in the first layer is detected and unauthorized communication is observed in the first layer (corresponding to "case where the attack depth shallower than the second level") as illustrated in FIG. 6C, the external transmission rule is updated such that the logs up to L4: transport layer of the OSI model in the security sensor C of the central ECU in the second layer is set as the external transmission target.

As described above, the constituent element determined as the external transmission target differs depending on the attack depth of the cyber attack. Accordingly, it is possible collect appropriate and necessary logs according to the cyber attack situation.

FIG. 6 illustrates an example of the case of the abnormal log in FIG. 4. The same processing as that in the case of the normal log in FIG. 5 may be performed. Specifically, the external transmission target may be determined per ECU, per log type, and/or per CAN ID according to the attack depth of the cyber attack.

The internal transmission rule for the abnormal log or the normal log may be updated in a manner similar to the external transmission rule.

(6) Internal Transmission Rule and Update Examples Thereof

The internal transmission rule is considered as a rule concerning extending the time period of retaining (in other words, retention period) logs collected by respective ECUs. Specifically, taking advantage of the storage unit 104 having a larger storage capacity than the storage regions 114 of respective ECUs, the internal transmission rule ensures that the information needed to take measures against a cyber attack upon detecting the cyber attack in the future is stored.

For example, in the case of the configurations of the ECUs in FIG. 2, the internal transmission rule update determiner unit 205 of the center device 200 sets logs of the ECUs in the first layer and the second layer as the internal transmission target in normal times. In this case, the internal transmission target includes the log that is generated in a deeper layer than the external transmission target determined by the external transmission rule update determiner unit 204. As a result, when a cyber attack is detected in the first layer, a log of the ECU in the second layer is acquirable retroactively from the past.

Upon detecting a cyber attack, the internal transmission rule update determiner unit 205 updates the internal transmission rule such that the internal transmission target includes a log of the ECU in the third layer in addition to logs in the first layer and the second layer.

Now, the internal transmission rule update will be described from the viewpoint of the log management device 100.

The number of logs set as collection target (the same as the internal transmission target) by the log collection manager unit 102 according to the internal transmission rule is larger than the number of logs set as the external transmission target by the external transmission manager unit 103 according to the external transmission rule. In case that a cyber attack is actually detected in the future, the log generated by the constituent element lower in the layer than the log pre-set as the external transmission target is included in the internal transmission target.

In other words, the ECU (corresponding to a "first electronic control device") that generates the log not included in the external transmission target in the external transmission rule but included in the collection target in the internal transmission rule is located in a lower layer than the ECU (corresponding to a "second electronic control device") that generates the log included in the external transmission target in the external transmission rule.

(7) Method and Program

Operations of the log management device 100 and the center device 200 of the present embodiment will be described with reference to a flowchart of FIG. 7.

The following operations are to be understood as the disclosure of not only methods executed by the log management device 100 and the center device 200 but also processing procedures in programs executable by these devices.

Figure 7:
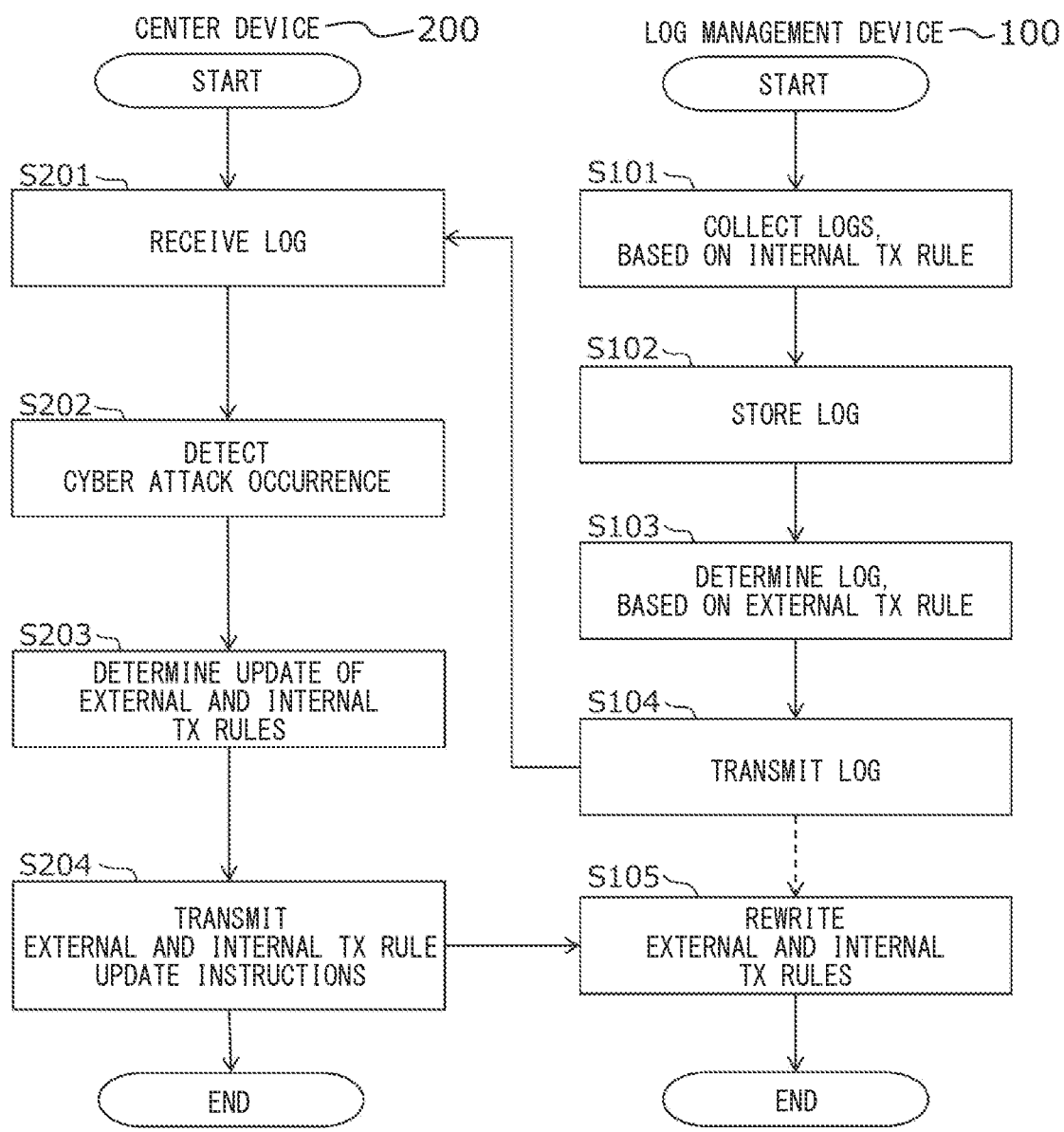
FIG. 7 is a flowchart illustrating operations of the center device and the log management device according to an embodiment of the present disclosure.

These processes are not limited to being executed in the order illustrated in FIG. 7. Specifically the order may be changed when the change is free from a relationship in which a certain step uses a result of the preceding step.

In S101, the log collection manager unit 102 of the log management device 100 collects logs based on the internal transmission rule.

In S102, the storage unit 104 stores the logs collected by the log collection manager unit 102.

In S103, the external transmission manager unit 103 determines a log to be transmitted to the center device 200 based on the external transmission rule.

In S104, the transmitter unit 105 transmits the log determined by the external transmission manager unit 103 to the center device 200.

In S201, the receiver unit 201 of the center device 200 receives the log transmitted from the log management device 100.

In S202, the log analyzer unit 203 analyzes the log received by the receiver unit 201 to detect the occurrence of a cyber attack.

In S203, the external transmission rule update determiner unit 204 and the internal transmission rule update determiner unit 205 determines the update of the external transmission rule and the update of the internal transmission rule, based on the detection result.

In S204, the transmitter unit 207 transmits the external transmission rule update instruction and the internal transmission rule update instruction.

In S105, the receiver unit 106 of the log management device 100 receives the external transmission rule update instruction and the internal transmission rule update instruction, and the log collection manager unit 102 rewrites the internal transmission rule and the external transmission manager unit 103 rewrites the external transmission rule.

2. Other Embodiments

In the above embodiment, the center device 200 determines update details of the external transmission rule and update details of the internal transmission rule, and gives the update instruction to the log management device 100. In another embodiment, the center device 200 may perform only giving the update instruction, and the update details may be determined by the log management device 100.

In yet another embodiment, the update details of the external transmission rule may be determined by the center device 200, and the update details of the internal transmission rule may be determined by the log management device 100.

3. Aspects

The cyber attack detection system, the log management device, and the center device in embodiments have been described above.

Since the terms used in embodiments are examples, the terms may be replaced with terms that are synonymous or encompass synonymous functions.

The block diagram used in the description of the embodiments represents classification and arrangement of the configurations of the devices on a function basis. The blocks representing the respective functions may be implemented by any combination of hardware or any combination of hardware and software. Since the blocks represent the functions, the block diagram is to be understood as disclosures of a method and a program for implementing the method.

Functional block understandable as processes, flows, and methods described in respective embodiments may be changed in order and arrangement when the change is free from a relationship in which a certain block uses a result of preceding block.

The terms such as first, second, to N-th (where N is an integer) used in embodiments and in the claims may be used to distinguish two or more configurations and methods of the same kind and are not intended to limit the order or superiority.

The above-described embodiments assume the vehicle-mounted equipment for vehicle. However, this is an example. The equipment may be dedicated equipment for other than vehicle. The equipment may be for general purposes.

The above described embodiments assume the vehicle-mounted equipment mounted in a vehicle. In another embodiment, the equipment may be carried by a pedestrian.

Examples of forms of the log management device and the center device include the form of component, the form of semi-finished product and the form of finished product.

Examples of the form of component include a semiconductor device, an electronic circuit, a module, and a microcomputer.

Examples of the form of semifinished product include an electronic control unit (electronic control unit (ECU)) and a system board.

Examples of the form of finished product include a cellular phone, a smartphone, a tablet computer, a personal computer (PC), a workstation, and a server.

The devices may include a device having a communication function and the like, and include, for example, a video camera, a still camera, and a car navigation system.

Devices and functions such as an antenna and a communication interface may be added to the vehicle-mounted equipment or the center device.

The center device may be used to provide various services. In providing services, the center device may operate and/or execute a program in the way described above.

Embodiments are not limited to the forms implemented by dedicated hardware having the configurations and functions described in the embodiments. The embodiments may be implemented by combinations of a program stored on storage medium such as a memory, a hard disk, etc., and general-purpose hardware that include a dedicated or general-purpose CPU that can execute the program, a memory, and the like.

A program stored in a non-transitory tangible storage medium (for example, an external storage device (a hard disk, a USB memory, a CD/BD, etc.) of dedicated or general-purpose hardware, or an internal storage device (a RAM, a ROM, or the like)) may also be provided to dedicated or general-purpose hardware via a non-transitory storage medium or from a server via a communication line via or not via a non-transitory storage medium. This makes it possible to provide the latest functions through program upgrade.

In embodiments, the vehicle-mounted equipment is an electronic control unit mounted in an automobile which is an example of vehicle. In some embodiments, the vehicle-mounted equipment may applied to a motorcycle, a bicycle with an electric motor, a railroad, etc. The equipment may be applied to movable objects including a pedestrian, a ship, and an aircraft.

The technical concept embodied into the vehicle-mounted equipment may be applied to a device used for various uses, examples of which include a cellular phone, a tablet computer, and a game machine.

The units and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

What is claimed is:

1. A center device comprising:
a receiver unit that receives a log that vehicle-mounted equipment mounted in a vehicle transmits based on an external transmission rule defining the log to be transmitted to outside of the vehicle;
a log analyzer unit that analyzes the log to detect occurrence of a cyber attack;
an external transmission rule update determiner unit that, upon the log analyzer unit detecting the cyber attack, determines update of the external transmission rule based on a result of the detecting; and
a transmitter unit that transmits an external transmission rule update instruction to the vehicle-mounted equipment upon determining the update of the external transmission rule;
wherein:
the vehicle-mounted equipment includes constituent elements that are defined in layers, respectively;
the constituent elements of the vehicle-mounted equipment include a communication electronic control unit (ECU) that is a contact point with the outside of the vehicle;
a depth of each of the layers becomes deeper as a distance from the communication ECU increases;
as an attack depth of the cyber attack is deeper, the external transmission rule update determiner unit sets an external transmission target to the log that is generated in a deeper layer among the layers;
the constituent elements of the vehicle-mounted equipment additionally include an electronic control device, a security sensor, and an open system interconnection (OSI) model element;
the security sensor is a constituent element of the electronic control device, and the OSI model element is a constituent element of the security sensor;
the OSI model element includes a data link layer, a network layer, a transport layer, and an application layer that become deeper in a stated order;
the external transmission rule update determiner unit sets the external transmission target using different kinds of the constituent elements in accordance with the attack depth of the cyber attack;
the communication ECU belongs to a first layer of the layers;
the constituent elements of the vehicle-mounted equipment include, as the electronic control device, a central ECU connected to the communication ECU and belonging to a second layer of the layers;
the central ECU includes, as the security sensor, a security sensor for network monitoring and a security sensor for host monitoring that belongs to a layer deeper than the security sensor for network monitoring;
when the attack depth of the cyber attack to the communication ECU is deeper than a first level, the external transmission rule update determiner unit sets the external transmission target to all logs generated in the central ECU;
when the attack depth of the cyber attack to the communication ECU is shallower than a second level, the external transmission rule update determiner unit sets the external transmission target to logs generated in the data link layer, the network layer, and the transport layer included in the OSI model element in the security sensor for network monitoring;
when the attack depth of the cyber attack to the communication ECU is between the first level and the second level, the external transmission rule update determiner unit sets the external transmission target to all logs generated in the security sensor for network monitoring;
when the attack depth of the cyber attack to the communication ECU is deeper than the first level is a case where the there is a possibility that control in the communication ECU is already hacked;
when the attack depth of the cyber attack to the communication ECU is between the first level and the second level is a case where there is a possibility of intrusion into the communication ECU; and
when the attack depth of the cyber attack to the communication ECU is shallower than the second level is a case where unauthorized communication is observed in the communication ECU.

2. The center device according to claim 1, further comprising:
an internal transmission rule update determiner unit that upon detecting the cyber attack, determines update of an internal transmission rule defining a log to be transmitted from a second electronic control device included in the vehicle-mounted equipment to a first electronic control device included in the vehicle-mounted equipment, the second electronic control device being located in a layer deeper than the first electronic control device,
wherein:
the transmitter unit transmits an internal transmission rule update instruction to the vehicle-mounted equipment when the update of the internal transmission rule is determined; and
the internal transmission rule update determiner unit sets an internal transmission target to the log that is generated in, of the layers, a layer deeper than the external transmission target determined by the external transmission rule update determiner unit.

3. The center device according to claim 1, wherein the security sensor is configured to monitor whether there is an abnormality in communication or internal processing of the electronic control device, and generate a security log when there is the abnormality.

4. A log collection method comprising:
receiving a log that vehicle-mounted equipment transmits based on an external transmission rule defining the log to be transmitted to outside of the vehicle-mounted equipment, the vehicle-mounted equipment including constituent elements that are defined in layers, respectively, the constituent elements including a security sensor, an open system interconnection (OSI) model element, a communication electronic control unit (ECU) that belongs to a first layer of the layers and that is a contact point with the outside of the vehicle-mounted equipment, and a central ECU connected to the communication ECU and belonging to a second layer of the layers, the security sensor being a constituent element of the central ECU and including a security sensor for network monitoring and a security sensor for host monitoring that belongs to a layer deeper than the security sensor for network monitoring, the OSI model element being a constituent element of the security sensor, a depth of each of the layers becoming deeper as a distance from the communication ECU increases, the OSI model element including a data link layer, a network layer, a transport layer, and an application layer that become deeper in a stated order;

analyzing the log to detect occurrence of a cyber attack;

upon detecting the cyber attack, determining update of the external transmission rule based on a result of the detecting by setting, as attack depth of the cyber attack becomes deeper, an external transmission target to the log that is generated in a deeper layer among the layers, the external transmission target being set using different kinds of the constituent elements in accordance with the attack depth of the cyber attack;

transmitting an external transmission rule update instruction to the vehicle-mounted equipment when the update of the external transmission rule is determined;

setting, when the attack depth of the cyber attack to the communication ECU is deeper than a first level, all logs generated in the central ECU as the external transmission target;

setting, when the attack depth of the cyber attack to the communication ECU is shallower than a second level, logs generated in the data link layer, the network layer, and the transport layer included in the OSI model element in the security sensor for network monitoring as the external transmission target; and setting, when the attack depth of the cyber attack to the communication ECU is between the first level and the second level, all logs generated in the security sensor for network monitoring as the external transmission target, the attack depth of the cyber attack to the communication ECU being deeper than the first level is a case where the there is a possibility that control in the communication ECU is already hacked, the attack depth of the cyber attack to the communication ECU being between the first level and the second level is a case where there is a possibility of intrusion into the communication ECU, and the attack depth of the cyber attack to the communication ECU being shallower than the second level is a case where unauthorized communication is observed in the communication ECU.

5. A non-transitory storage medium storing a log collection program executable by a center device, the log collection program causing the center device to perform:

receiving a log that vehicle-mounted equipment transmits based on an external transmission rule defining the log to be transmitted to outside of the vehicle-mounted equipment;

analyzing the log to detect occurrence of a cyber attack;

upon detecting the cyber attack, determining update of the external transmission rule based on a result of the detecting; and transmitting an external transmission rule update instruction to the vehicle-mounted equipment when the update of the external transmission rule is determined;

wherein:

the vehicle-mounted equipment includes constituent elements that are defined in layers, respectively;

the constituent elements of the vehicle-mounted equipment include a communication electronic control unit (ECU) that is a contact point with the outside of the vehicle-mounted equipment;

a depth of each of the layers becomes deeper as a distance from the communication ECU increases;

determining the update of the external transmission rule includes, as an attack depth of the cyber attack is deeper, setting an external transmission target to the log that is generated in a deeper layer among the layers;

the constituent elements of the vehicle-mounted equipment additionally include an electronic control device, a security sensor, and an open system interconnection (OSI) model element;

the security sensor is a constituent element of the electronic control device, and the OSI model element is a constituent element of the security sensor;

the OSI model element includes a data link layer, a network layer, a transport layer, and an application layer that become deeper in a stated order;

the external transmission target is set using different kinds of the constituent elements in accordance with the attack depth of the cyber attack;

the communication ECU belongs to a first layer of the layers;

the constituent elements of the vehicle-mounted equipment include, as the electronic control device, a central ECU connected to the communication ECU and belonging to a second layer of the layers;

the central ECU includes, as the security sensor, a security sensor for network monitoring and a security sensor for host monitoring that belongs to a layer deeper than the security sensor for network monitoring;

when the attack depth of the cyber attack to the communication ECU is deeper than a first level, all logs generated in the central ECU are set as the external transmission target;

when the attack depth of the cyber attack to the communication ECU is shallower than a second level, logs generated in the data link layer, the network layer, and the transport layer included in the OSI model element in the security sensor for network monitoring are set as the external transmission target;

when the attack depth of the cyber attack to the communication ECU is between the first level and the second level, all logs generated in the security sensor for network monitoring are set as the external transmission target;

when the attack depth of the cyber attack to the communication ECU is deeper than the first level is a case where the there is a possibility that control in the communication ECU is already hacked;

when the attack depth of the cyber attack to the communication ECU is between the first level and the second level is a case where there is a possibility of intrusion into the communication ECU; and when the attack depth of the cyber attack to the communication ECU is shallower than the second level is a case where unauthorized communication is observed in the communication ECU.

6. A log management device that collects and manages a log from electronic control devices included in vehicle-mounted equipment mounted in a vehicle, the log management device comprising:

a log collection manager unit that collects the log based on an internal transmission rule defining the log to be transmitted from the electronic control devices to the log management device;

a storage unit that stores the log collected by the log collection manager unit;
an external transmission manager unit that determines the log to be transmitted to a center device based on an external transmission rule defining the log to be transmitted to outside of the vehicle; and
a transmitter unit that transmits the log determined by the external transmission manager unit, wherein
the electronic control devices are defined in layers, respectively;
the electronic control devices include a communication electronic control unit (ECU) that is a contact point with the outside of the vehicle;
a depth of each of the layers becomes deeper as a distance from the communication ECU increases;
the external transmission rule sets an external transmission target to the log that is generated in a deeper layer among the layers as an attack depth of the cyber attack is deeper;
constituent elements of the vehicle-mounted equipment additionally include a security sensor and an open system interconnection (OSI) model element;
the security sensor is a constituent element of each of the electronic control devices, and the OSI model element is a constituent element of the security sensor;
the OSI model element includes a data link layer, a network layer, a transport layer, and an application layer that become deeper in a stated order;
the external transmission rule sets the external transmission target using different kinds of the constituent elements in accordance with the attack depth of the cyber attack;
the communication ECU belongs to a first layer of the layers;
the vehicle-mounted equipment includes, as one of the electronic control devices, a central ECU connected to the communication ECU and belonging to a second layer of the layers;
the central ECU includes, as the security sensor, a security sensor for network monitoring and a security sensor for host monitoring that belongs to a layer deeper than the security sensor for network monitoring;
when the attack depth of the cyber attack to the communication ECU is deeper than a first level, all logs generated in the central ECU are set as the external transmission target;
when the attack depth of the cyber attack to the communication ECU is shallower than a second level, logs generated in the data link layer, the network layer, and the transport layer included in the OSI model element in the security sensor for network monitoring are set as the external transmission target;
when the attack depth of the cyber attack to the communication ECU is between the first level and the second level, all logs generated in the security sensor for network monitoring are set as the external transmission target;
when the attack depth of the cyber attack to the communication ECU is deeper than the first level is a case where the there is a possibility that control in the communication ECU is already hacked;
when the attack depth of the cyber attack to the communication ECU is between the first level and the second level is a case where there is a possibility of intrusion into the communication ECU; and
when the attack depth of the cyber attack to the communication ECU is shallower than the second level is a case where unauthorized communication is observed in the communication ECU.

7. The log management device according to claim 6, wherein
the storage unit has a storage capacity larger than a storage region in which the electronic control device stores the log.

8. The log management device according to claim 6, further comprising:
a receiver unit that receives an instruction from the center device, wherein
the log collection manager unit and the external transmission manager unit respectively rewrite the internal transmission rule and the external transmission rule based on the instruction.

9. The log management device according to claim 8, wherein the instruction is transmitted when the center device detects a cyber attack on the vehicle-mounted equipment.

10. The log management device according to claim 6, wherein the log management device is mounted in a movable object.

11. The log management device according to claim 6, wherein
the number of logs being a collection target in the internal transmission rule is larger than the number of logs being the external transmission target in the external transmission rule.

12. The log management device according to claim 6, wherein
the security sensor is configured to monitor whether there is an abnormality in communication or internal processing of the electronic control device, and generate a security log when there is the abnormality.

13. A log management method executed by a log management device that collects and manages a log from electronic control devices included in vehicle-mounted equipment, the electronic devices being defined in layers, respectively, and including a communication electronic control unit (ECU) that belongs to a first layer of the layers and is a contact point with the outside of the vehicle-mounted equipment and a central ECU connected to the communication ECU that belongs to a second layer of the layers, a depth of each of the layers becoming deeper as a distance from the communication ECU increases, constituent elements of the vehicle-mounted equipment including a security sensor and an open system interconnection (OSI) model element, the security sensor being a constituent element of each of the electronic control devices, the OSI model element being a constituent element of the security sensor, the OSI model element including a data link layer, a network layer, a transport layer, and an application layer that become deeper in a stated order, the central ECU including, as the security sensor, a security sensor for network monitoring and a security sensor for host monitoring that belongs to a layer deeper than the security sensor for network monitoring, the log management method comprising:
collecting the log based on an internal transmission rule defining the log to be transmitted from the electronic control devices to the log management device;
storing the collected log;
determining the log to be transmitted to a center device based on an external transmission rule defining the log to be transmitted to outside of the vehicle-mounted equipment, the external transmission rule setting an external transmission target to the log that is generated in a deeper layer among the layers as an attack depth of the cyber attack is deeper, and the external transmission rule setting the external transmission target using different kinds of the constituent elements in accordance with the attack depth of the cyber attack;

transmitting the determined log;

setting, when the attack depth of the cyber attack to the communication ECU is deeper than a first level, all logs generated in the central ECU as the external transmission target;

setting, when the attack depth of the cyber attack to the communication ECU is shallower than a second level, logs generated in the data link layer, the network layer, and the transport layer included in the OSI model element in the security sensor for network monitoring as the external transmission target; and setting, when the attack depth of the cyber attack to the communication ECU is between the first level and the second level, all logs generated in the security sensor for network monitoring as the external transmission target, the attack depth of the cyber attack to the communication ECU being deeper than the first level being a case where the there is a possibility that control in the communication ECU is already hacked, the attack depth of the cyber attack to the communication ECU being between the first level and the second level being a case where there is a possibility of intrusion into the communication ECU, and the attack depth of the cyber attack to the communication ECU being shallower than the second level being a case where unauthorized communication is observed in the communication ECU.

14. A non-transitory storage medium storing a log management program executable by a log management device that collects and manages a log from electronic control devices included in vehicle-mounted equipment, the log management program causing the log management device to perform:

collecting the log based on an internal transmission rule defining the log to be transmitted from the electronic control devices to the log management device;

storing the collected log;

determining the log to be transmitted to a center device based on an external transmission rule defining the log to be transmitted to outside of the vehicle-mounted equipment; and transmitting the determined log;

wherein:

the electronic control devices are defined in layers, respectively;

the electronic control devices include a communication electronic control unit (ECU) that is a contact point with the outside of the vehicle-mounted equipment;

a depth of each of the layers becomes deeper as a distance from the communication ECU increases;

the external transmission rule sets an external transmission target to the log that is generated in a deeper layer among the layers as an attack depth of the cyber attack is deeper;

constituent elements of the vehicle-mounted equipment additionally a security sensor and an open system interconnection (OSI) model element;

the security sensor is a constituent element of each of the electronic control devices, and the OSI model element is a constituent element of the security sensor;

the OSI model element includes a data link layer, a network layer, a transport layer, and an application layer that become deeper in a stated order;

the external transmission rule sets the external transmission target using different kinds of the constituent elements in accordance with the attack depth of the cyber attack;

the communication ECU belongs to a first layer of the layers;

the vehicle-mounted equipment includes, as one of the electronic control devices, a central ECU connected to the communication ECU and belonging to a second layer of the layers;

the central ECU includes, as the security sensor, a security sensor for network monitoring and a security sensor for host monitoring that belongs to a layer deeper than the security sensor for network monitoring;

when the attack depth of the cyber attack to the communication ECU is deeper than a first level, all logs generated in the central ECU are set as the external transmission target;

when the attack depth of the cyber attack to the communication ECU is shallower than a second level, logs generated in the data link layer, the network layer, and the transport layer included in the OSI model element in the security sensor for network monitoring are set as the external transmission target;

when the attack depth of the cyber attack to the communication ECU is between the first level and the second level, all logs generated in the security sensor for network monitoring are set as the external transmission target;

when the attack depth of the cyber attack to the communication ECU is deeper than the first level is a case where the there is a possibility that control in the communication ECU is already hacked;

when the attack depth of the cyber attack to the communication ECU is between the first level and the second level is a case where there is a possibility of intrusion into the communication ECU; and when the attack depth of the cyber attack to the communication ECU is shallower than the second level is a case where unauthorized communication is observed in the communication ECU.

15. The log management device according to claim 11, wherein a second electronic control device that generates the log not included in the external transmission target in the external transmission rule but included in the collection target in the internal transmission rule is located in a layer deeper than a first electronic control device that generates the log included in the external transmission target in the external transmission rule.

* * * * *